Dec. 27, 1955 E. L. CONNELL 2,728,252
PREDETERMINED TORQUE RELEASE THREADED
FASTENER SETTING TOOL
Filed May 28, 1953 4 Sheets-Sheet 4
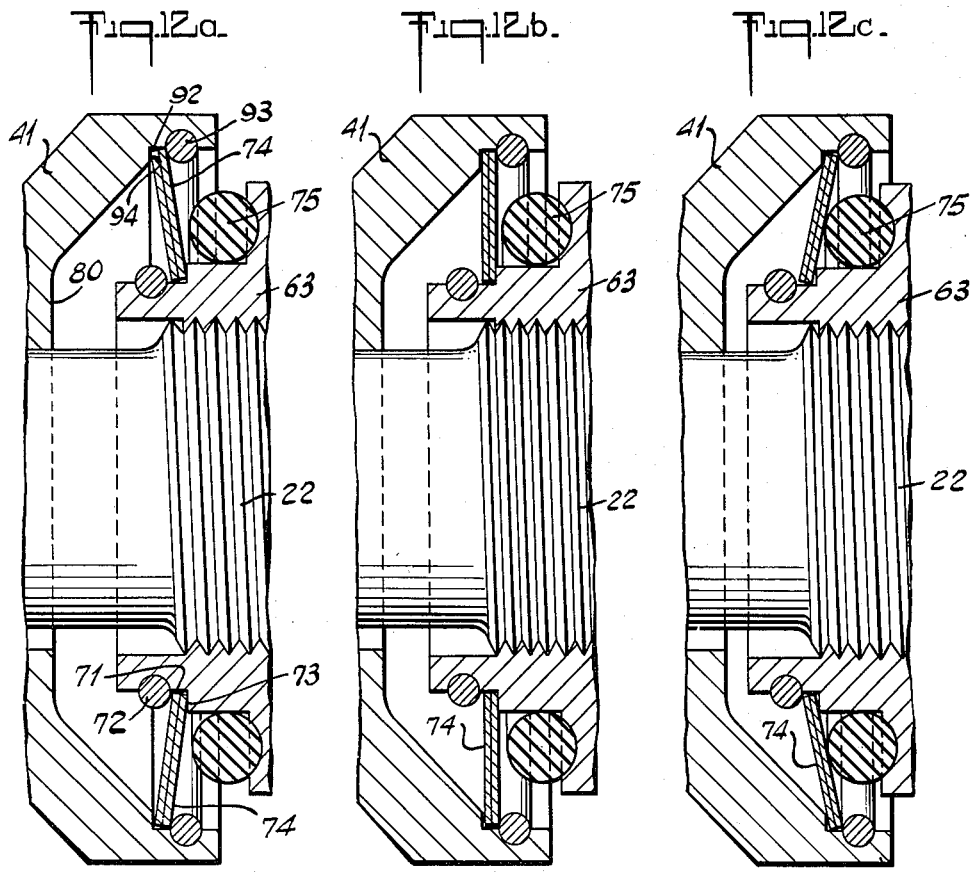
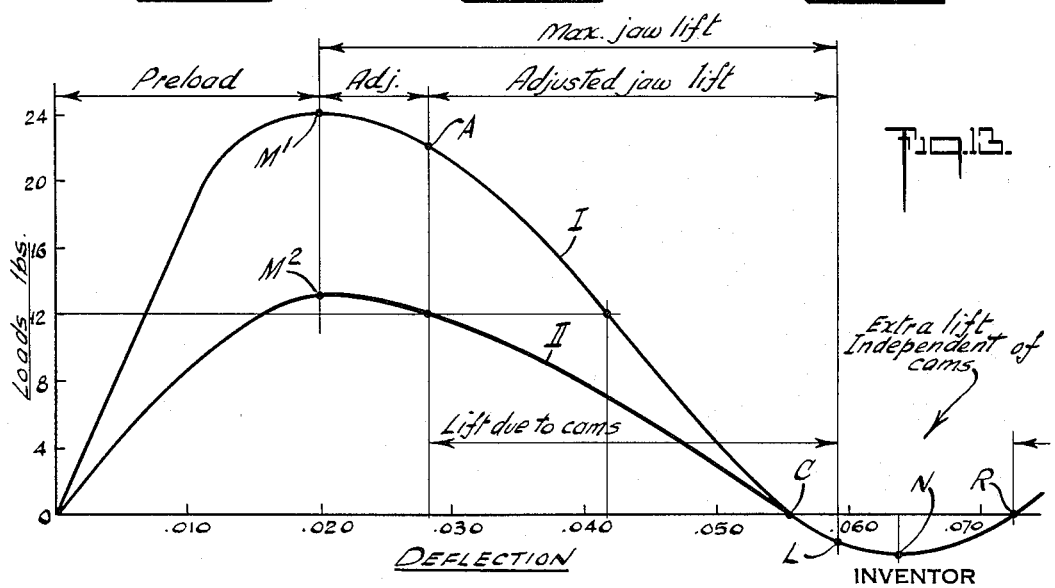
INVENTOR
EDWIN L. CONNELL
BY
Raymond G. Mullee
ATTORNEY

United States Patent Office 2,728,252
Patented Dec. 27, 1955

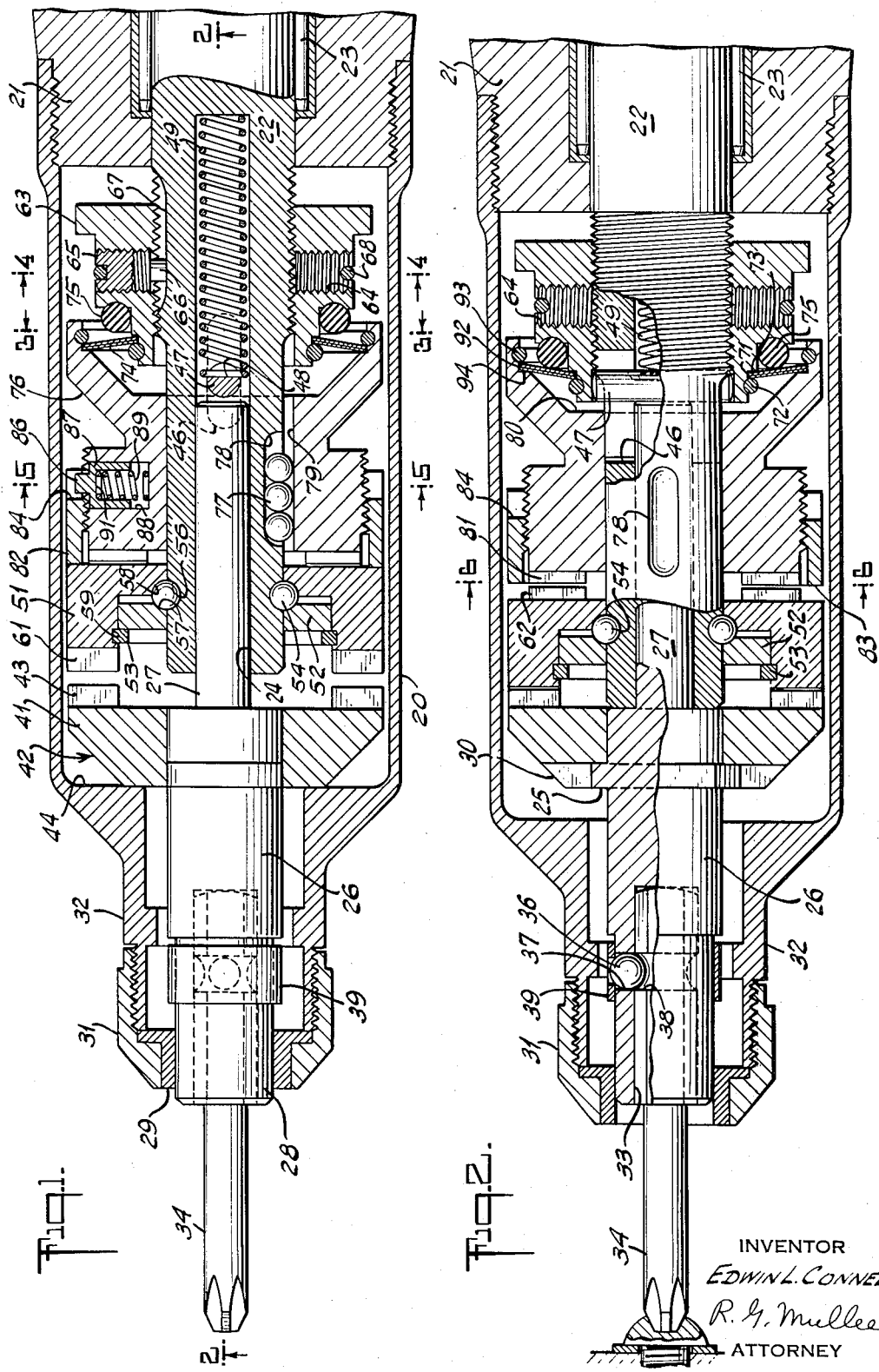

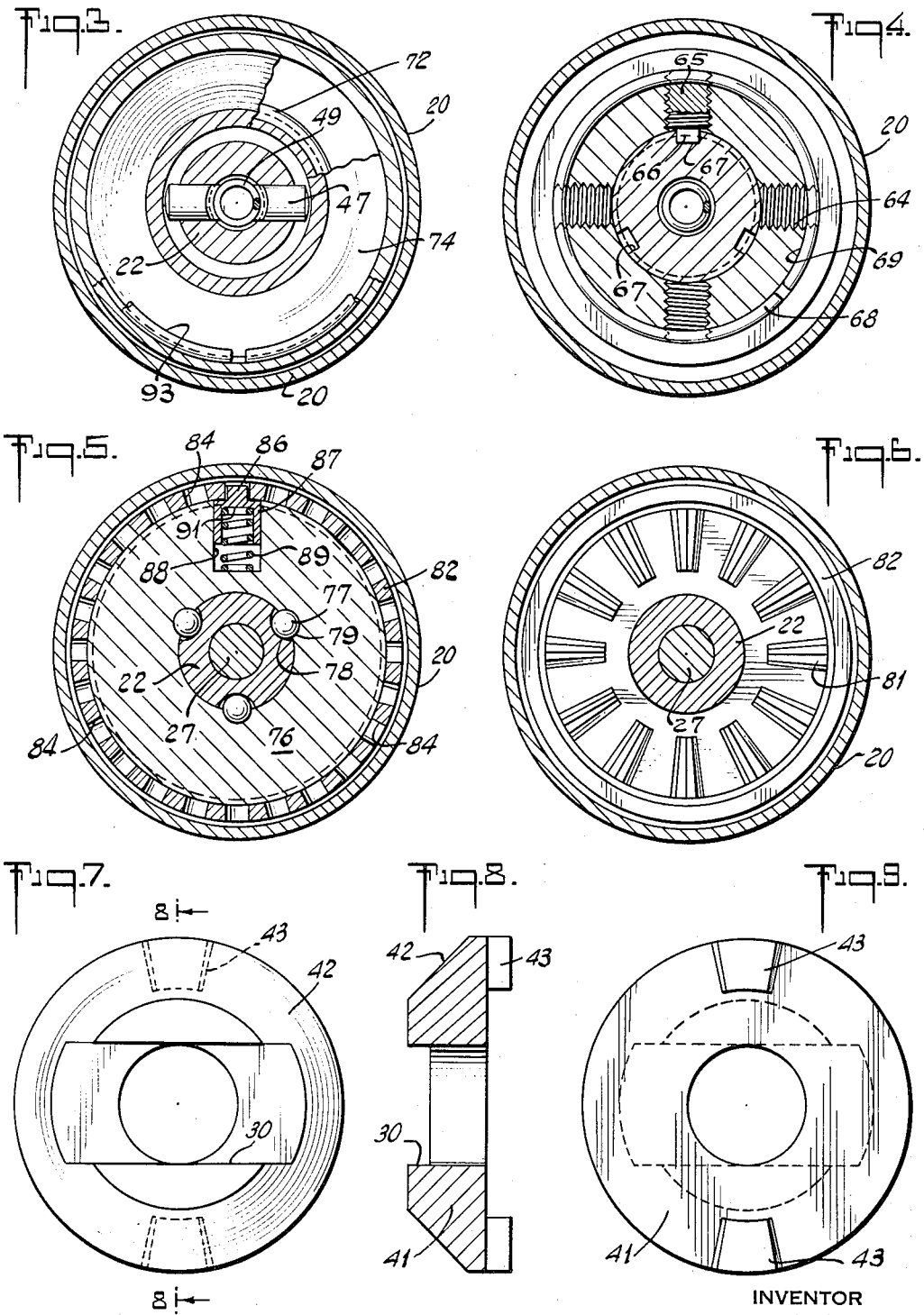

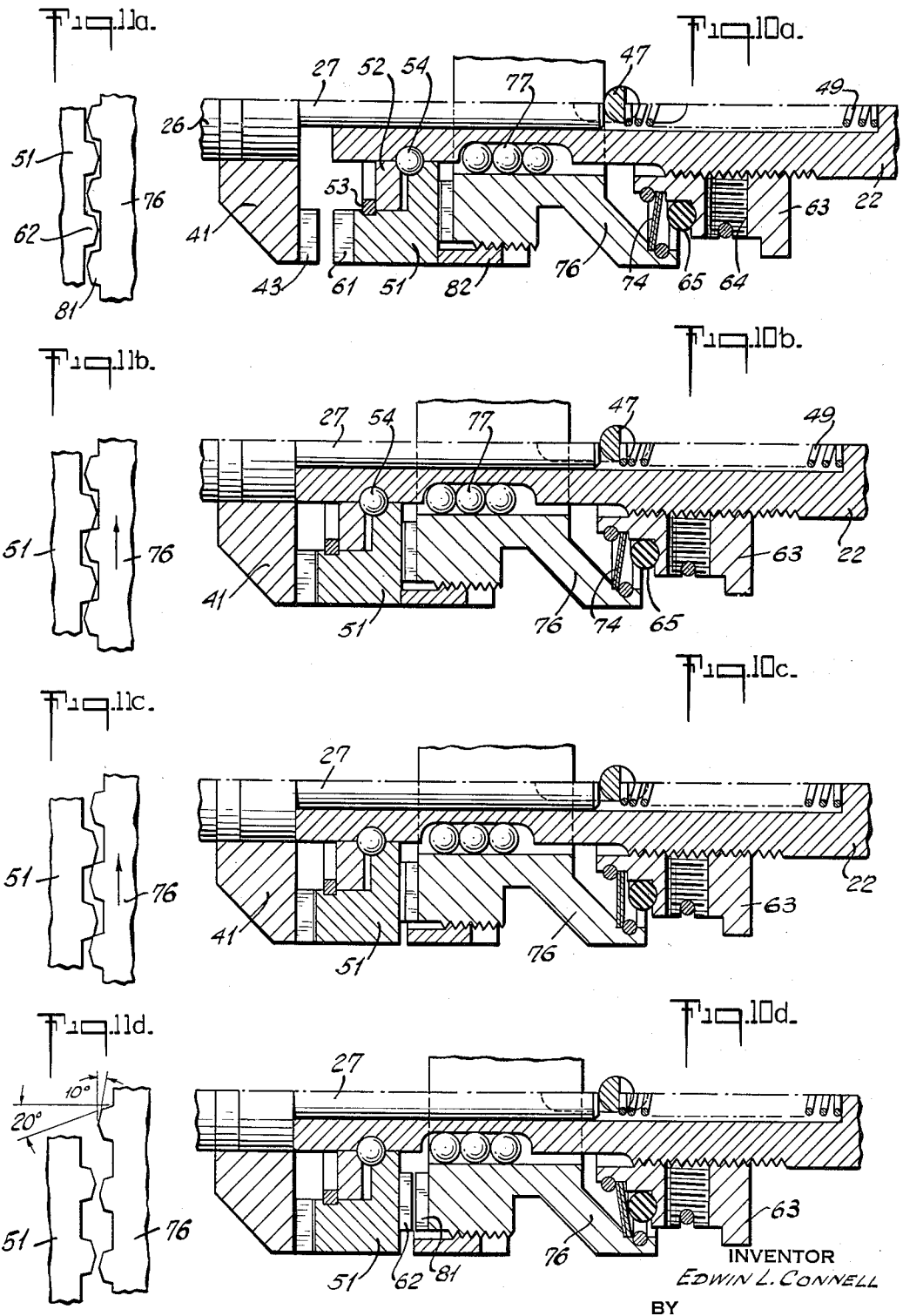

2,728,252

PREDETERMINED TORQUE RELEASE THREADED FASTENER SETTING TOOL

Edwin L. Connell, Utica, N. Y., assignor to Chicago Pneumatic Tool Company, New York, N. Y., a corporation of New Jersey Application May 28, 1953, Serial No. 358,127

20 Claims. (Cl. 81—52.4)

This invention relates to a tool for running up and setting threaded fasteners, and more particularly, to a clutch which provides an automatic torque cut-off arrangement for such a tool.

In high production assembly operations wherein threaded fasteners, such as nuts and screws, are required to be run up and set, there is need for a tool which will quickly run up and set such fasteners, and also provide a uniform final setting torque, whereby the internal stress of all the fasteners set is within an order of magnitude desired. Many tools designed to meet this need are not satisfactory since they may be cumbersome to handle, complicated in structure, unreliable in operation, or costly to manufacture and maintain. In addition, many of the prior art tools have clutches which after initial disengagement, repeatedly disengage and re-engage with a ratcheting, or impacting action, because the holding spring that is effective to resist separation of the clutch teeth prior to attainment of maximum load, is also effective to urge the clutch teeth together again as soon as the disengaging force is removed. In some of such clutch arrangements, one of the movable clutch elements is held in disengaged position by means of a locking device, but such locking devices are frequently ineffective because the disengaging force ceases the instant the tops of the clutch teeth over-ride each other, and any slippage of the locking device will permit the holding spring to cause partial re-engagement of the clutch teeth.

The tool of this invention avoids the shortcomings of the prior art devices. Briefly it comprises a clutch which includes, a rotatable spindle for engaging a fastener, which spindle is detachably connected to one of a pair of intermeshing driven elements; a driving element, rotatable by means of a power unit, the driving element being maintained in operative engagement with one of the driven elements by means of a pre-loaded Belleville spring; and a re-set spring, for returning the driving element to operative engagement with the driven element upon removal of the tool from a fastener. As resistance to rotation of the spindle increases during fastener setting operation, the driven and driving elements are cammed apart due to the arrangement of clutch intermeshing teeth, thereby further compressing the Belleville spring. When said spring is forced by compressive action past a critical point of deflection, it snaps over and in so doing, disconnects the driving element from the driven element, and thereafter maintains the driving element in disconnected position, thus preventing further rotation of the spindle. The tool is provided with means to adjust the degree of Belleville spring pre-loading, as well as the relative position of the driving element with respect to the driven element, whereby maximum output torque delivered at the spindle is regulated within a predetermined range.

The object of this invention is to provide a threaded fastener setting tool which will quickly run up and set fasteners at a uniform final setting torque.

Another object is to provide a torque cut-off arrangement for a rotary tool, which will disconnect a driving element from a driven element when a predetermined output torque is realized.

Another object is to provide an automatic torque cut-off clutch which will prevent ratcheting, or impacting, of the clutch teeth, after the teeth have once been disengaged.

Another object is to provide an automatic torque cut-off clutch wherein the clutch teeth upon disengagement, are given an additional separating movement so that the possibility of ratcheting, or impacting, is avoided, thereby preventing, among other things, rapid deterioration of the clutch teeth.

A further object is to provide a clutch having movable clutch elements which are held together with a holding force which diminishes as the clutch elements move apart, thus being a reversal of the teachings of the prior art.

A further object is to incorporate a Belleville type spring in the assemblage of a threaded fastener setting tool, to provide automatic torque cut-off at predetermined load.

Another object is to incorporate a Belleville type spring in the assemblage of a threaded fastener setting tool, in such a manner that the spring will be effective to prevent any disengaging movement between the clutch teeth until predetermined cut-off load is attained, thereby avoiding excessive wear on the clutch teeth.

Further objects are to provide a threaded fastener setting tool which is convenient to handle, simple in structure, reliable in operation, and which has low manufacturing and maintenance cost.

These and further objects of the invention will become more apparent from a study of the following disclosure and the attached drawings, in which:

Fig. 1 is a longitudinal sectional view of a tool embodying the invention, and illustrating the relative position of certain elements when the tool is in idle condition;

Fig. 2 is similar to Fig. 1 except illustrating the relative position of certain elements at time of torque cut-off;

Figs. 3 to 6 are cross sectional views as seen from respective section lines in Figs. 1 and 2;

Fig. 7 is a front end view of a driven jaw used in the subject invention;

Fig. 8 is a cross sectional view as seen from line 8—8 in Fig. 7;

Fig. 9 is a rear end view of the driven jaw of Fig. 7;

Fig. 10a is a fragmentary longitudinal sectional view similar to the illustration of Fig. 1, showing the relative position of certain elements, when the tool is in idle or nonoperative condition;

Fig. 10b is similar to Fig. 10a, but showing the relative position of certain elements when the tool is in operative position, and at the beginning of a fastener run-up operation;

Fig. 10c is similar to Fig. 10a, but showing the relative position of certain elements when the tool is in operative position, and prior to disconnection, or declutching, of the driving and driven elements and at some stage during clutch movement toward disengagement;

Fig. 10d is similar to Fig. 10a, but showing the relative position of certain elements when the tool is in operative position, and after declutching of the driving and driven elements;

Figs. 11a to 11d are fragmentary views illustrating the relative position of the jaws of the driving and driven elements in the respective illustrations of Figs. 10a to 10d;

Fig. 12a is an enlarged sectional view illustrating the position of the Belleville spring and associated parts, in the condition of the tool as illustrated in Figs. 10a and 10b;

Fig. 12b is similar to Fig. 12a, but with the tool condition as illustrated in Fig. 10c;

Fig. 12c is similar to Fig. 12a, but with the tool condition as illustrated in Fig. 10d; and Fig. 13 is a graphic illustration of the characteristics of the Belleville spring used in the tool, showing deflection vs. load.

Referring now to Fig. 1, a tool illustrative of an embodiment of the invention comprises a housing 20 threadably connected at the rear end to a portion 21 of a power unit, or motor (not shown), which may be of the pneumatic or electric type. A spindle 22, extending into the housing 20, is arranged to be rotated by the motor, and is supported within the latter by bearing means, such as a needle bearing 23, shown in part. Within the spindle is formed a bore hole 24, which extends from the free end of the spindle to a depth of approximately ten times the diameter of the bore hole. A cylindrical shank 26 is rotatively mounted within the forward portion of the housing 20, and has a rear portion 27 of reduced diameter which is slidingly fitted within the bore hole 24, and a forward portion 28 of reduced diameter, which is slidingly fitted within a bushing 29. The bushing 29 is supported in a nipple 31, which is threadably secured to a reduced diameter nose portion 32, of the housing 20. Shank 26 has a hexagonal bore hole 33 to slidingly receive a tool implement, 34, the free end of the latter being adapted to engage the head of the fastener to be set, as shown. The tool implement 34 is maintained within the bore hole 33 by means of a ball 36 positioned within a hole 37 formed in the forward portion 28, and projecting within an annular groove 38 formed upon the periphery of the tool implement. The ball 36 is urged toward the groove 38, by means of a cylindrical spring 39, which encircles the forward portion 28 of the shank 26, and is split to provide radial flexibility.

Rigidly mounted on the body of the shank 26 is a driven jaw 41, which is disc-like in form. While any type of mounting may be used, the particular mounting shown includes wings 25, formed integral with the shank 26, which are arranged to engage a slot 30, formed in the forward face of driven jaw 41. As best seen in Figs. 7–9, the forward edge 42 of the driven jaw 41 is chamfered for clearance within the housing, while upon the rear surface are formed two diametrically opposed radial jaw members 43. The forward surface of the driven jaw 41 is arranged to abut a shoulder 44, formed in the housing 20, when the shank 26 is in full forward, or non-operative position, as seen in Fig. 1.

Two opposed longitudinal slots 46 are formed within the spindle 22 to slidingly receive a reset pin 47. The mid-portion of the reset pin has a flattened portion 48 which serves as a seating surface for a helical re-set, or declutching, spring 49, which is compressively maintained within the spindle bore-hole 24 between the reset pin and the bottom of said bore-hole. Such arrangement provides a thrust force which constantly urges the shank 26, and attached driven jaw 41 in the direction of the tool nose portion 32.

Near the forward end of the spindle 22 is rotatably mounted an intermediate jaw assembly comprising an intermediate jaw 51, a ball retainer element 52, a retainer ring 53, and a plurality of balls 54. The balls 54 are arranged to travel in an annular, or toroidal, raceway formed in part by a semi-circular groove 56 on the periphery of the spindle 22, and quaterly-circular grooves 57, 58, on the edges of the ball retainer 52, and the intermediate jaw 51, respectively. The retainer ring 53, which is seated in a groove 59 formed on an inner peripheral surface of the intermediate jaw 51, abuts against the side of the retainer 52 to thereby maintain the intermediate jaw in position upon the spindle 22. Inner diameters of the intermediate jaw 51 and the retainer 52, are somewhat larger than the diameter of the spindle 22, so that said elements are free to rotate upon the spindle. A pair of diametrically opposed radial jaw members 61, similar in size and shape to the jaw members 43, are formed on the forward face of the intermediate jaw 51, while on the opposite face thereof are formed jaws, or teeth 62.

A spring hub 63 is threadably mounted upon the spindle 22 near the housing portion 21, and has four equi-spaced set screw holes 64, arranged radially with respect to the spindle. A set screw 65 positioned within one of the holes 64, has a projection 66 for engagement with any one of three equi-spaced longitudinal slots 67 formed on the surface of the spindle 22. By means of such arrangement, the spring hub 63 can be axially adjusted upon the spindle, for reasons which will be indicated, and can be locked in any position of adjustment. To maintain the screw 65 in set position, the top thereof is slotted to receive a snap ring 68, which encircles the spring hub 63, and is confined within a slot 69 formed on the periphery of the spring hub. Near the forward end of the spring hub 63, an annular groove 71 is formed by means of a retaining ring 72 spaced a short distance forwardly of a shoulder 73 formed on the periphery of the spring hub. The groove 71 is arranged to receive and loosely maintain the inner portion of an initially coned annular-disk spring assembly 74, each spring being more commonly referred to as a "Belleville spring." The diameters of the holes in said spring assembly 74 are slightly greater than the diameter of the bottom of groove 71, so that the spring assembly will not be confined against contraction in a diametric plane. An O ring 75, made of rubber, or neoprene, is mounted on the spring hub 63, and is arranged to absorb any momentum tending to deflect the spring appreciably beyond the normal snap-out position (Fig. 2). This ring 75 serves as a buffer to absorb some of the kinetic energy at snap-out, to thereby prevent the springs 74 from rebounding and automatically returning to their original condition.

The Belleville spring assembly 74 is comprised of one or more Belleville springs designed to provide load-deflection characteristics as illustrated in the graph of Fig. 13. The abscissa represents the degree of spring movement, or axial deflection (inches), while the ordinate represents the load (lbs.), axially applied to the springs to achieve the corresponding deflection. It is to be understood that the load shown will bear a proportional relation to the actual work load i. e., torque (lb.-in.) developed by the tool, which will depend upon the shape of clutch teeth 62, 81. As load is applied to the springs, resistance to movement increases until a maximum point "M" is reached. Further deflection is accomplished at decreasing load, until a critical point "C" is reached. At critical point "C" the springs begin to snap out and a negative load is established. Such negative load in effect exerts a pulling action upon the member which caused spring deflection to the critical point "C." The negative load represented upon the graph as that portion of the curve shown below the abscissa, has a maximum negative value identified by the point "N." Clutch jaws 62, 81 are designed to force the spring 74 past the critical point "C" a short distance, such as to a point "L." The spring assembly 74, will come to rest so that the point of maximum deflection is beyond the negative portion of the curve, such as at a point "R." A reverse load of approximately 10% of maximum load, is required to force the spring assembly back past the critical point "C," after which the springs will tend to return to the point of minimum deflection.

The two curves shown in Fig. 13 illustrate spring characteristics achieved by the use of different materials, viz., curve I wherein the springs are made of steel, curve II wherein the springs are made of beryllium copper. For small load operations, the use of Belleville springs having characteristics as illustrated by curve II, may be more desirable, because of easier adjustment and better control. For example, at a declining load of 12 lbs., it will be seen in the case of curve II, that a further deflection of approximately .027" i. e., .055"–.028", is required before the critical point "C" is reached, whereas, in the case of curve I, a further deflection of only approximately .013" i. e., .055"–.042", is required to reach critical point "C." Thus the allowable range for adjustment of a particular load in the case of curve II, is not as critical as in the case of curve I. For a full discussion of the design and characteristics of Belleville springs, reference is made to a treatise entitled "The uniform-section disk springs," by J. O. Almen and A. Laszlo, published in the Transactions of the American Society of Mechanical Engineers, vol. 58, p. 305 et seq. (RP–58–10).

A driving jaw 76 is mounted for reciprocal movement upon the spindle 22, between the intermediate jaw 51 and the spring hub 63. The driving jaw 76 is restrained from rotary motion relative to the spindle 22, by means of three sets of balls 77 which engage three equi-spaced longitudinal slots 78 formed on the spindle, and three equi-spaced longitudinal slots 79 formed on an inner surface of the element 76. The forward face of the driving jaw 76 has a plurality of teeth 81, which are equal in number and of the same shape as the teeth 62 on the rear face of intermediate jaw element 51. The proportions of the angular surfaces of teeth 62, 81, are indicated in Fig. 11d. As will be noted, the sides of each tooth are sloped 20°, while the tops have crest angles of 10°. Such tooth crests prevent the tops of the teeth from seating, and permit smooth engagement of the two sets of teeth 62, 81.

When the clutch elements are in the relative position illustrated in Fig. 1, there is no resistance to rotation because spindle 22, driving jaw 76, and intermediate jaw 51, will rotate independently of the driven jaw 41, which is disconnected from jaw 51, and hence is at rest. These clutch elements are placed under load by the engagement of the teeth 43 with teeth 61, which is accomplished by the tool operator pressing the tool bit 34 against a work piece, thereby shifting the bit shank 26 and driven jaw 41 rearwardly, and compressing the declutch spring 49. Since the teeth 81 are still in mesh with teeth 62, rotary motion of the spindle 22 will continue to be transmitted via the driving jaw 76, to the intermediate jaw 51. However, as the resistance to rotation increases, the spring force on the driving jaw 76 is opposed and finally overcome by the camming action of intermeshed teeth 62, 81. Thereupon the jaw 76 is moved rearwardly, compressing spring assembly 74, until the latter is forced past its critical point of deflection, which results in the complete disengagement of teeth 62 and 81.

A calibrating sleeve 82 is threadably mounted upon the periphery of the driving jaw 76, the forward edge 83 thereof being in abutment with the rear face of intermediate jaw 51. It will be seen that by rotary adjustment of the calibrating sleeve 82 relative the driving jaw 76, the calibrating sleeve is effective to regulate the normal extent of mesh between teeth 81 and 62. The reason for such adjustment will be discussed hereinafter. It is to be noted that the ends of reset pin 47 are arranged to abut a rear face 80 of the driving jaw 76, so that the latter may be returned to original position upon completion of a fastener setting operation, as will be seen shortly.

A plurality of radially extending notches 84 are arranged along the rear edge of the calibrating sleeve 82, that is, on the edge opposite forward edge 83 thereof. Notches 84 are adapted to receive the projection 86 of a locking pin 87, which is maintained in a bore 88 formed in the driving jaw 76. A helical spring 89 is compressively arranged within the bore 88 to abut against the bottom of a bore 91, formed in the pin 87, to urge the latter in the direction of the calibrating sleeve 82, whereby the projection 86 will be maintained in engagement with one of the notches 84. The body of pin 87, being of greater width than that of a notch 84, will abut the lower surface of material surrounding a notch, and thus limit the outward movement of pin 87 from the hole 88. By means of the locking pin 87 in cooperation with the notches 84, the calibrating sleeve 82 can be maintained in adjusted position upon the driving jaw 76 so that the degree of mesh between teeth 81 and 62, will remain in adjusted position.

Toward the rear end of the driving jaw 76, and on an inner periphery thereof, is provided an annular groove 92, formed by means of a retaining ring 93 spaced a short distance rearwardly of a shoulder 94 formed on an inner portion of the driving jaw 76. The groove 92 is arranged to receive and loosely maintain the outer portion of the Belleville spring assembly 74, the exterior diameter of said spring assembly being slightly less than the diameter of the groove 92, so that the spring assembly will not be confined against expansion in a diametric plane. It is to be noted that when the tool is in operative, or torque delivery condition, the Belleville spring assembly 74 is dished rearwardly (Fig. 1), and is dished forwardly when the tool is in torque release condition (Fig. 2).

In conditioning the tool for fastener setting operations, wherein a predetermined cut-off torque is desired, the spring hub 63 is rotated upon the spindle 22 thereby compressing the Belleville spring assembly 74, so that the preload thereon rises from zero to maximum, point "M" on the graph (Fig. 13). The teeth 62, 81 of intermediate jaw element 51 and driving jaw 76 respectively, are meshed to full extent prior to, and during preload adjustment. Further compression of springs 74 is had at decreasing load, as is indicated in the graph, and a point of desired torque cut-off will be somewhere on the descending curve, such at point "A." The point for any desired torque cut-off is set by use of the calibrating sleeve 82, which when rotated upon the driving jaw 76, will cause the springs 74 to be compressed, and also move the teeth 81 out of full mesh with teeth 62. Upon being set at desired torque cut-off point, the calibrating sleeve is locked in position by means of the locking pin 87 engaging one of the slots 84. It is thus seen that by means of calibrating sleeve adjustment, the degree of jaw lift is reduced; also the precompression of Belleville springs 74 is further increased so that the torque cut-off point is lowered.

The teeth 62, 81 are maintained in meshing relationship by action of the spring assembly 74, with a force depending upon the final set of said spring assembly, as provided by the calibrating sleeve 82. As the load on the tool increases as a fastener is driven to set position, the resistance to rotation increases with the result that the driving jaw 76 is forced away from the intermediate jaw 51, by the camming action developed between teeth 62, 81. It is to be understood, however, that there is no relative separating movement between the jaws 76 and 51, prior to the time that the torque load, and hence the teeth separating force, attain the predetermined maximum cut-off torque for which the tool had been set. Once such cut-off torque is developed, continued rotation of the tool spindle 22, is accompanied by an axial movement of the driving jaw 76 against the holding force of the Belleville spring assembly 74. Such holding force, in contrast with the performance of conventional torque release clutches, diminishes in resistance starting from the maximum, as soon as the separating movement of driving jaw 76 from intermediate jaw 51 begins. When the spring assembly 74 reaches critical point "C," it begins to snap out, and in so doing provides the negative force, which in effect pulls the teeth 62, 81 apart, so that rotary motion is no longer transmitted to the implement 34.

At a predetermined torque cut-off, the separation of teeth 62, 81 is accomplished very rapidly and in the absence of any accidental re-engaging or impacting effect. Any impacting effect is avoided since the Belleville spring assembly 74 gives the driving jaw 76 an added separation, in addition to the separation caused by the teeth camming action, and the driving jaw 76 is maintained in such separated position as a result of the characteristics of springs 74, as best illustrated in Fig. 13. The elapsed time for spring deflection between a point of predetermined load cut-off and the critical point "C," is extremely small. For example, in the case of a maximum condition, such as on curve I between points "M¹" and "C," such time was calculated to be approximately .00022 second. This time was calculated on the basis of a motor driving speed of 1000 R. P. M., and a relative rotation between the driving jaw 76 and intermediate jaw 51 of approximately 1.35°, and where the teeth 62, 81 has the general conformation and proportions as illustrated in the drawings. The load on the teeth 62, 81 as they separate is very small, a factor contributing to maintenance of adjustment and long life. This results in part from the use of the calibrating sleeve 82, whereby rubbing of the teeth during torque build-up to the maximum is prevented, which rubbing prior to declutching generally occurs in prior art devices.

Once the teeth 62, 81 are disengaged they will be maintained in such condition as a result of the negative force provided by the spring assembly 74, and will be so maintained until the tool implement 34 is removed by the operator from forced engagement with the set fastener. When the latter occurs, the declutching spring 49 will, by way of reset pin 47, force the bit shank 26 forwardly, thereby disengaging jaws 43 from jaws 61, and at the same time it will move the driving jaw 76 forwardly, by way of reset pin 47 in contact with face 80, so that the teeth 81 will be again fully meshed with teeth 62. Spring 49, upon being thus released, forces the Belleville spring assembly 74, to original condition, as seen in Figs. 1, 11a, and 12a. Thereafter the spindle 22, driving jaw 76, and intermediate jaw 51, will continue to rotate in unison under no load, and independently of the driven jaw 41. The tool is then ready for another fastener setting operation.

It is to be noted that once the tool has been set or adjusted, it will repeatedly provide torque cut-off at the set load. If it is desired to adjust the tool for torque cut-off at some other point on the curve between maximum point "M" and critical point "C," all that is necessary is that the calibrating sleeve 82 be rotated, so that the degree or extent of deflection of springs 74, are as required for the desired setting.

It will be apparent that the invention may readily be embodied in a tool of any desired size or capacity by applying the teachings above in the following steps:

1. The shape, proportions, dimensions and characteristics of the Belleville springs 74 are chosen with the objective of obtaining a load deflection curve which rises from zero to a maximum then descends until it crosses the zero line and reverses upwardly again, the major portion of the curve being above zero. This can be done by resort to known design procedures and formulae as shown for example in the Almen and Laszlo treatise supra.

2. The selected high point M¹ or M² on the curve is determined with reference to the shape of the clutch teeth or cams 62 and 81 so that when the torque to be delivered through said cams attains the maximum, the axial thrust between the cams will correspond to the maximum point on the curve. The high point M¹ can be changed by varying the number of springs 74 or the characteristics of the springs.

3. The horizontal distance between the maximum and minimum points, M¹ and R respectively is determined with reference to the height of the clutch teeth. The latter (M¹ to L) should be less than the distance M¹ to R (in order to prevent re-engagement of teeth after the Belleville spring has attained its stable position of rest R), but more than the horizontal distance M¹ to C (in order to assure that the Belleville spring will continue the separating movement where the cams leave off). The determination of horizontal distances pre-supposes that the jaw lift will be additional to the pre-compression of the spring from zero to the position below M¹ effected solely by the action of adjusting hub 63.

In the assembly of the tool, special attention is given to the hub 63 so that it pre-compresses the springs 74 by the right amount. As stated previously, the amount of pre-compression should be such that when added to the jaw lift, the horizontal measurement on the curve will be greater than the distance O to C and less than the distance O to R. If the parts have been built strictly in accordance with step 3 above, the preload (due to hub 63 alone) will be just sufficient to reach the high point on the curve. Whether it falls exactly on the high point of the curve or not is not critical. It is more important that the sum of the pre-load deflection (due to hub 63 alone) and the jaw height produce the desired deflection, with the point L lying between points C and R, and this total deflection can be adjusted by turning the hub 63.

In practice the setting of hub 63 should rarely be disturbed. It is frequently desired, however, to adjust the point of cut-off, below the highest torque value permitted by the tool, and that is done by turning the calibrating sleeve 82. The latter in a sense adds to the pre-load deflection by moving the normal position of the spring from point M¹ to point A. The calibrating sleeve, unlike the adjusting hub 63, ceases to function the instant that the jaws deflect the spring beyond the point A and has no effect on the location of point L or final resting place of the spring, namely point R. Whatever deflection is added to the spring by the calibrating sleeve is deducted from the effective height of the jaws.

By changing the adjustment of hub 63 or calibrating sleeve 82, no change is made in the shape of the curve shown in Fig. 13. Changing the adjustment of hub 63 changes correspondingly the point at which the jaws start to separate and the point L at which the jaws are disengaged. Altering the adjustment of calibrating sleeve 82 changes the point at which the jaws start to move from a position of partial disengagement but does not change the point L on the curve where the jaws disengage by just clearing each other. As long as the tool remains adjusted as indicated by the point A, the cycle of operation of the spring will be represented only by the path from A to R and back again, with perhaps some slight overrun at the point R due to momentum. The buffer ring 75, acts as a resilient stop at this point. The spring remains close to point R until the operator intervenes by withdrawing pressure of the tool against the work.

In the absence of the buffer 75 the active portion of the curve could continue beyond point R to the right to an extreme point above the zero line after which the curve would retrace its path. In some instances rebound would be sufficient to retrace as far back as point L resulting in re-engagement.

It should be further noted that the tool is reversible and will operate equally well in either direction of rotation.

What is claimed is:

1. A threaded fastener setting tool comprising a combination including a rotary power unit, a driving element coupled to said power unit, a driven element arranged for disruptable engagement with said driving element and adapted to fixedly receive a fastener setting implement and a holding element arranged to exert a mechanical holding force to maintain said driven and driving elements in relative immovable engagement until a predetermined resistance to rotation is applied to said driven element, and to allow for disengaging movement between said driving and driven elements with said holding force decreasing in magnitude as disengaging movement increases, and which is further arranged to hold the driving and driven elements disengaged once disengagement between said elements is effected.

2. A threaded fastener setting tool comprising a combination including a rotary power unit, a driving element coupled to said power unit, a driven element arranged for disruptable engagement with said driving element and adapted to fixedly receive a fastener setting implement, and a resilient element arranged to exert a holding force to maintain said driven and driving elements in relative immovable engagement until a predetermined resistance to rotation is applied to said driven element, and to allow for disengaging movement between said driving and driven elements with a decreasing holding force as disengaging movement increases, said resilient element being further arranged to hold the driving and driven elements disengaged once disengagement between said elements is effected.

3. A threaded fastener setting tool comprising a combination including a rotary power unit, a driving element coupled to said power unit, a driven element arranged for disruptable engagement with said driving element and adapted to fixedly receive a fastener setting implement, and a Belleville spring arranged to maintain said driven and driving elements in relative immovable engagement until a predetermined resistance to rotation is applied to said driven element after which said spring allows complete disengagement of said elements and is effective to maintain said elements in disengaged position.

4. A threaded fastener setting tool comprising in combination a rotary power unit, a spindle rotatable by said power unit, a driving jaw affixed to the spindle and arranged for axial movement thereon, a driven jaw rotatably mounted upon the spindle, a housing enclosing the driving and driven jaws and removably affixed to the power unit, an implement shank rotatably supported by said housing and adapted for axial movement into engagement with said driven jaw, and a Belleville spring assembly arranged between the driving jaw and the spindle adapted to maintain the driving jaw in engagement with the driven jaw until a predetermined rotary load is applied to the shank during a fastener setting operation, and further adapted to permit disengagement of the driving jaw from the driven jaw after the predetermined load is reached, said Belleville spring assembly being further adapted to maintain the driving jaw out of engagement with the driven jaw after disengagement is effected.

5. A threaded fastener setting tool comprising in combination a rotary power unit, a spindle rotatable by said power unit, a driving jaw affixed to the spindle and arranged for axial movement thereon, a driven jaw rotatably mounted upon the spindle, a spring hub adjustably mounted on the spindle, a housing enclosing the driving and driven jaws and removably affixed to the power unit, an implement shank rotatably supported in the housing and adapted for axial movement into engagement with the driven jaw, and a Belleville spring assembly arranged between the driving jaw and the spring hub adapted to maintain the driving jaw in engagement with the driven jaw until a predetermined rotary load is applied to the shank during a fastener setting operation, and further adapted to permit disengagement of the driving jaw from the driven jaw after the predetermined load is reached, said Belleville spring assembly being further arranged to maintain the driving jaw out of engagement with the driven jaw after disengagement is effected.

6. A threaded fastener setting tool according to claim 5, wherein said shank has a portion which extends into and is rotatably supported by said spindle.

7. A threaded fastener setting tool according to claim 6, wherein a declutching spring is compressively arranged between the spindle and the portion of the shank within the spindle.

8. A threaded fastener setting tool according to claim 7, wherein a reset pin is interposed between the declutching spring and the shank portion within the spindle, said reset pin being arranged to project outside said spindle for engagement with a rear surface of the driving jaw.

9. A threaded fastener setting tool according to claim 5, wherein said driving jaw has a plurality of teeth which are adapted to engage with a plurality of corresponding teeth formed on the driven jaw, said teeth all being formed to provide a disengaging thrust on the driving jaw when relative angular movement is effected between the driving and driven jaws.

10. A threaded fastener setting tool according to claim 9, wherein a calibrating sleeve is adjustably mounted upon the driving jaw whereby the amount of engagement between the teeth of the driving jaw and driven jaw, can be varied.

11. A threaded fastener setting tool according to claim 10, wherein a locking pin is arranged in the driving jaw to lock the calibrating sleeve in position upon the driving jaw.

12. A threaded fastener setting tool according to claim 5, wherein said driving jaw is adapted for axial movement with respect to the spindle by means of a plurality of balls which are arranged to roll in longitudinal grooves formed on the spindle periphery and on the inner surface of the driving jaw.

13. A threaded fastener setting tool according to claim 12, wherein jaw members are provided on the driven jaw for engagement with jaw members provided on the bit shank.

14. A threaded fastener setting tool according to claim 13, wherein a declutch spring is arranged between the spindle and the shank to urge the jaws of the shank out of engagement with the jaws of the driven member.

15. A threaded fastener setting tool according to claim 14, wherein said driven jaw is adapted for rotary motion upon the spindle by means of a plurality of balls which are arranged to roll in a groove formed in part on the periphery of the spindle and in part on the inner surface of the driven jaw.

16. A threaded fastener setting tool according to claim 15, wherein the spring hub is adapted for adjustable mounting upon the spindle by means of a threaded engagement with said spindle, and is further adapted to be locked in adjusted position upon said spindle.

17. A threaded fastener setting tool according to claim 16, wherein a buffer means for the Belleville spring is mounted upon the spring hub.

18. In a clutch, a freely rotatable driven element adapted to be coupled to an increasing torque load, a driving element engageable with said driven element and movable axially out of engagement with said driven element, and an initially coned annular disk spring arranged to exert an axial thrust on the driving element to maintain the latter in relatively immovable engagement with the driven element, and being further arranged to permit disengagement of the driving element from the driven element after a predetermined maximum torque load is applied to the driven element.

19. In a clutch according to claim 18, wherein the coned annular-disk spring is arranged to maintain the driving element out of engagement with the driven element after said elements have once disengaged.

20. In a clutch a combination including a freely rotatable driven element adapted to be coupled to an increasing torque load, a driving element having a plurality of teeth arranged to mesh with a plurality of teeth on the driven element and movable out of engagement with said driven element, a holding spring arranged to maintain the driving element in toothed engagement with the driven element and further arranged to permit disengagement of said teeth after a predetermined torque load is applied to the driven element, said holding spring being adapted to be partially compressed by pre-load and further compressed by camming action of said teeth, and a plurality of pre-loading means one of which is arranged to adjust the start and finish point of the teeth camming action, another of which is arranged to adjust only the starting point of the teeth camming action.

References Cited in the file of this patent
UNITED STATES PATENTS

| 1,913,046 | Callan | June 6, 1933 |
| 2,047,737 | Lane | July 14, 1936 |
| 2,263,709 | Van Sittert | Nov. 25, 1941 |
| 2,475,518 | Ristow | July 5, 1949 |
| 2,600,327 | Ridge | June 10, 1952 |
| 2,632,485 | Peck | Mar. 24, 1953 |
| 2,634,640 | Pedersen | Apr. 14, 1953 |